United States Patent
Yamashita et al.

(10) Patent No.: US 10,976,343 B2
(45) Date of Patent: Apr. 13, 2021

(54) SENSOR DEVICE, SENSOR SYSTEM, AND INFORMATION PROCESSING DEVICE

(71) Applicant: SONY CORPORATION, Tokyo (JP)

(72) Inventors: Kosei Yamashita, Kanagawa (JP); Sho Murakoshi, Tokyo (JP); Suguru Aoki, Tokyo (JP)

(73) Assignee: SONY CORPORATION, Tokyo (JP)

(*) Notice: Subject to any disclaimer, the term of this patent is extended or adjusted under 35 U.S.C. 154(b) by 577 days.

(21) Appl. No.: 15/743,421

(22) PCT Filed: Jul. 15, 2016

(86) PCT No.: PCT/JP2016/071092
§ 371 (c)(1),
(2) Date: Jan. 10, 2018

(87) PCT Pub. No.: WO2017/043181
PCT Pub. Date: Mar. 16, 2017

(65) Prior Publication Data
US 2018/0203034 A1    Jul. 19, 2018

(30) Foreign Application Priority Data
Sep. 9, 2015  (JP) .............................. JP2015-177603

(51) Int. Cl.
| G01P 21/00 | (2006.01) |
| G01B 11/00 | (2006.01) |
| G01C 21/16 | (2006.01) |
| G01B 21/16 | (2006.01) |
| G01B 21/22 | (2006.01) |
| G01P 13/00 | (2006.01) |

(52) U.S. Cl.
CPC .............. *G01P 21/00* (2013.01); *G01B 11/00* (2013.01); *G01B 21/16* (2013.01); *G01B 21/22* (2013.01); *G01C 21/165* (2013.01); *G01P 13/00* (2013.01)

(58) Field of Classification Search
CPC ....... G01P 21/00; G01P 13/00; G01C 21/165; G01B 11/00; G01B 21/22; G01B 21/16
See application file for complete search history.

(56) References Cited

U.S. PATENT DOCUMENTS

| 5,889,550 A | 3/1999 | Reynolds |
| 2012/0111942 A1 | 5/2012 | Liu |
| 2013/0211774 A1* | 8/2013 | Bentley ................ A61B 5/6895 702/145 |
| 2014/0097238 A1 | 4/2014 | Ghazizadeh |

FOREIGN PATENT DOCUMENTS

| CN | 104848858 A | 8/2015 |
| JP | 2006-317223 A | 11/2006 |
| JP | 2008-070267 A | 3/2008 |
| JP | 2010-038847 A | 2/2010 |
| JP | 2013-188426 A | 9/2013 |
| WO | WO 2010/027015 A1 | 3/2010 |
| WO | WO 2014/099410 A1 | 6/2014 |

* cited by examiner

*Primary Examiner* — Alexander Satanovsky
*Assistant Examiner* — Mark I Crohn
(74) *Attorney, Agent, or Firm* — Paratus Law Group, PLLC

(57) ABSTRACT

There is provided a sensor device that can easily reduce an accumulated error in a sensor, the sensor device including: a first inertial sensor; a first information code formed to be capable of being imaged from an outside; and a first imaging unit capable of imaging a second information code formed on another sensor device.

15 Claims, 12 Drawing Sheets

FIG. 4
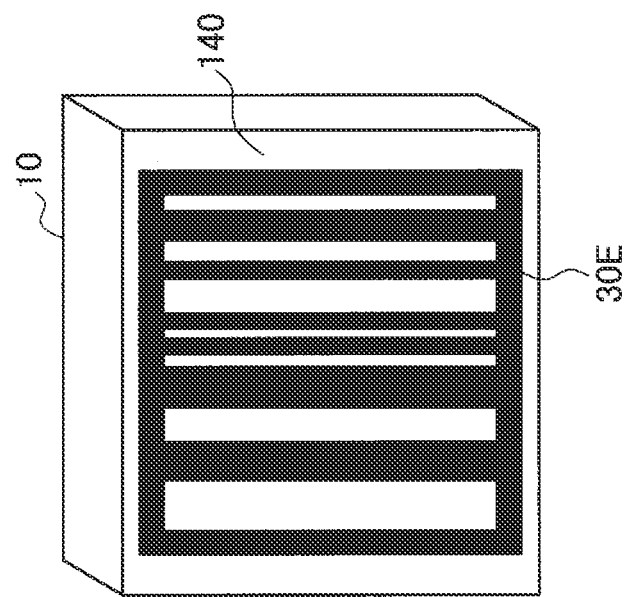
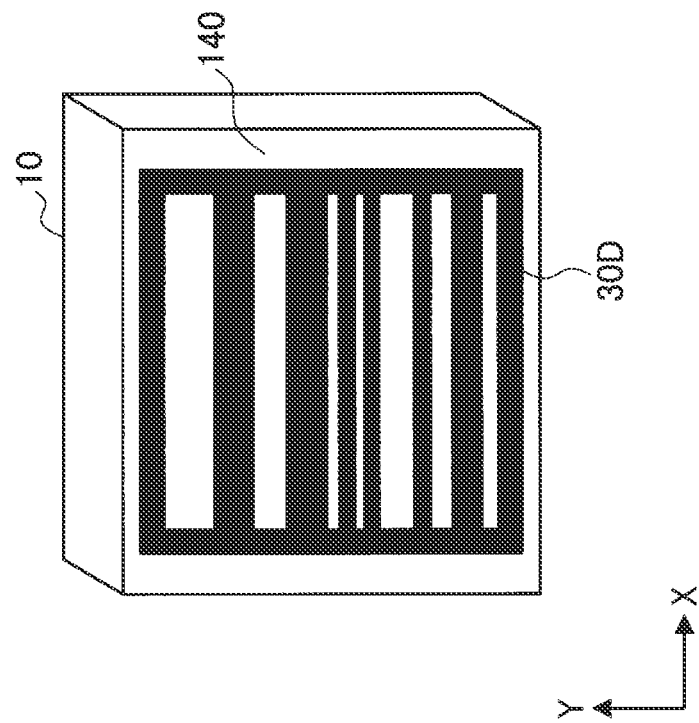

US 10,976,343 B2

SENSOR DEVICE, SENSOR SYSTEM, AND INFORMATION PROCESSING DEVICE

CROSS REFERENCE TO PRIOR APPLICATION

This application is a National Stage Patent Application of PCT International Patent Application No. PCT/JP2016/071092 (filed on Jul. 15, 2016) under 35 U.S.C. § 371, which claims priority to Japanese Patent Application No. 2015-177603 (filed on Sep. 9, 2015), which are all hereby incorporated by reference in their entirety.

TECHNICAL FIELD

The present disclosure relates to a sensor device, a sensor system, and an information processing device.

BACKGROUND ART

Recently, technology to visualize (that is, to digitize) a move of a body has been actively developed. In the field of sports, for example, technology is being developed to attach sensor devices to various parts of a body for visualizing a move of the body on the basis of the measurement results and contributing to improvement in forms, and the like.

For example. Patent Literature 1 below discloses technology that generates information regarding sports on the basis of sensor information indicating the behavior of a user who plays sports.

CITATION LIST

Patent Literature

Patent Literature 1: JP 2013-188426A

DISCLOSURE OF INVENTION

Technical Problem

However, sensor information measured by a sensor device can include errors. For example, the inertial sensor, which is the main sensor of the present technology, includes drift errors. Drift errors may thus cause a fatal accumulated error during the computing process based on the sensor information. It is then desirable to provide a mechanism that can easily reduce an accumulated error in a sensor.

Solution to Problem

According to the present disclosure, there is provided a sensor device including: a first inertial sensor; a first information code formed to be capable of being imaged from an outside; and a first imaging unit capable of imaging a second information code formed on another sensor device.

In addition, according to the present disclosure, there is provided a sensor system including: a plurality of sensor devices. The sensor devices each include an inertial sensor, an information code formed to be capable of being imaged from an outside, and an imaging unit capable of imaging the information code provided on the other sensor device.

In addition, according to the present disclosure, there is provided an information processing device including: a processing unit configured to process sensor information and captured images acquired from a plurality of sensor devices each including a sensor, an information code formed to be capable of being imaged from an outside, and an imaging unit capable of imaging the information code provided on another sensor device.

Advantageous Effects of Invention

As described above, according to the present disclosure, a mechanism that can easily reduce an accumulated error in a sensor is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an example of an information code according to the embodiment.

MODE(S) FOR CARRYING OUT THE INVENTION

Figure 1:
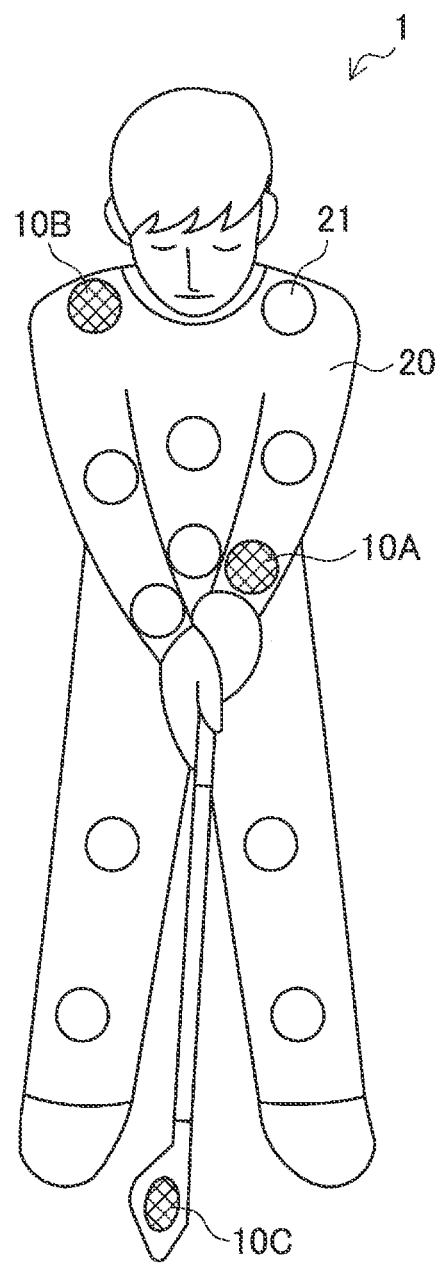
FIG. 1 is a diagram for describing an outline of a sensor system according to a first embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the specification and the drawings, different alphabetical letters may be given to components having substantially the same functional configuration for distinction after the same symbol is given to the components. For example, a plurality of components having substantially the same functional configuration are distinguished as sensor devices 10A, 10B, and 10C as necessary. However, in a case where it is unnecessary to particularly distinguish each of the plurality of components having substantially the same functional configuration, only the same symbol is given. For example, in a case where it is unnecessary to particularly distinguish sensor devices 10A, 10B, and 10C, the sensor devices are simply referred to as a sensor device 10.

The description will be now given in the following order:
1. Introduction
  1.1. Inertial navigation system
  1.2. Technical problem
2. First Embodiment
  2.1. Outline of sensor system
  2.2. Configuration example of sensor device that operates as slave
  2.3. Configuration example of sensor device that operates as master
  2.4. Flow of process
  2.5. Comparison with other methods
3. Second Embodiment
  3.1. Configuration example of sensor device
  3.2. Configuration example of server
  3.3. Flow of process
4. Conclusion 1. Introduction <1.1. Inertial Navigation System>

An inertial navigation system (INS) is one use of sensor information measured by an inertial sensor. An inertial navigation system is a technology that can compute its position by integrating angular velocity and acceleration a plurality of times and is employed in ships, aircraft, or the like, for example. Contents of a process by a sensor device employing an inertial navigation system will be described below:

First, the sensor device integrates the angular velocity (first integration) to compute its attitude (that is, an attitude angle in a real space). Next, the sensor device integrates the acceleration (second integration) to compute its speed. Then, the sensor device integrates the speed (third integration) to compute its movement distance. Then, the sensor device combines the vector of the movement distance and the attitude (that is, direction of movement) for each subdivision point to compute its relative position information with the initial position as a starting point. If the initial position is known, the sensor device can compute its absolute position information (that is, three-dimensional coordinates in a real space) by the above computing.

In an inertial navigation system, integration computing is performed three times in total for computing position information. For every integration computing, an error included in the target to be integrated accumulates; therefore, an accumulated error included in the computing results grows. Thus, the accumulated error included in the position information, which undergoes integration computing of three times, exponentially grows. Even though the error included in the raw sensor information (that is, angular velocity and acceleration) is minor, an enormous accumulated error will be included in the position information and cannot be ignored. On the other hand, attitude information, which undergoes integration computing of one time, includes a smaller accumulated error than that in the position information.

<1.2. Technical Problem>

Ships, aircraft, or the like use high-precision sensor devices to reduce the above-described accumulated errors. The tables below show examples of comparison in precision between a consumer micro electro mechanical systems (MEMS) sensor, which is generally used in wearable devices, and the like, and an industrial ring laser gyro and an industrial acceleration sensor, which are generally used in ships, aircraft, or the like. Table 1 is a comparison in which an accumulated error in attitude information grows with the lapse of time. Table 2 is a comparison in which an accumulated error in position information grows with the lapse of time.

TABLE 1

| Elapsed time | 5 seconds | 3 minutes | 1 hour |
|---|---|---|---|
| Consumer MEMS sensor | 0.5 degrees | 18 degrees | 360 degrees |
| Industrial ring laser gyro | 15 microdegrees | 540 microdegrees | 11 millidegrees |

TABLE 2

| Elapsed time | 5 seconds | 3 minutes | 1 hour |
|---|---|---|---|
| Consumer MEMS sensor | 50 centimeters | 9 kilometers | 69,000 kilometers |
| Industrial ring laser gyro and acceleration sensor | 0.04 millimeters | 61 centimeters | 4.7 kilometers |

With reference to the above Table 1 and Table 2, the accumulated error in a consumer MEMS sensor is far greater than those in the accumulated error in an industrial ring laser gyro and acceleration sensor. In addition, the comparison between Table 1 and Table 2 shows that the accumulated error in attitude information increases slowly, whereas the accumulated error in position information increases explosively.

Regarding the accumulated errors that remain to be included in industrial ring laser gyros and acceleration sensors, ships or aircraft acquire the absolute position information with GPS and the like as necessary to correct the computing results of the position information. Thus, ships or aircraft realize reduction of accumulated errors by using high-precision sensor devices and correcting position information with external information as necessary.

However, it is difficult for wearable devices to take measures similar to those of ships or aircraft. High-precision sensor devices are expensive and heavy, and therefore, they are not suited for usage such as attachment to human bodies. In addition, given that the errors in GPS can range up to several meters, GPS is unsuitable as a correction means for wearable devices that sense a move of human bodies. Receiving GPS signals for long time allows precise measurement; however, GPS is still unsuitable as a correction means for wearable devices given that the human bodies move.

2. First Embodiment

<2.1. Outline of Sensor System>

FIG. 1 is a diagram for describing an outline of a sensor system 1 according to the present embodiment. As illustrated in FIG. 1, the sensor system 1 includes a plurality of sensor devices 10 (that is, 10A to 10C) attached to a sensor attachment apparatus 20.

The sensor device 10 is a device that senses various kinds of data. The sensor device 10 is attached to a sensor attachment tool 21 included in the sensor attachment apparatus 20 to perform sensing targeting a move of a target object. A target object may be a human, a dog, a cat, or other living organisms, or may be a non-living organism such as a robot. In the example illustrated in FIG. 1, a target object is a user (that is, a human). In addition, the target object may be an object to be used by a living organism. For example, the target object may be a tool to be used for games such as a golf club, a tennis racket, a ski board, a ski boot, a goal, or a bat. In addition, the target object may be a tool to be used for living such as an artificial hand or a wheelchair. In addition, the target object may be a tool to be used for animals such as a collar or a horseshoe.

The sensor device 10 can measure a variety of data alone or in combination with another sensor device 10. The sensor device 10 can include, for example, an inertial sensor. Therefore, position information and attitude information of each of the sensor devices 10 can be computed by an inertial navigation system. In addition, by combining position information and attitude information of the plurality of sensor devices 10, a move of a body (for example, a bending degree of a joint held between the two sensor devices 10, a speed at which an arm is swung, a trajectory of a golf club, and the like) can be computed. Note that a process in which these kinds of information are computed from the sensing results (that is, sensor information) of the sensor device 10 may be performed by the sensor device 10 itself or other devices such as a server.

The sensor attachment apparatus 20 is an apparatus for fixing the sensor device 10 to a target object. As illustrated in FIG. 1, the sensor attachment apparatus 20 has one or more attachment positions (the sensor attachment tool 21) for removably attaching the sensor devices 10, and the sensor devices 10 can be attached to a part of or all of the attachment positions. The sensor attachment apparatus 20 may be formed into a shape that covers a part of or all of the trunk, the limbs, or the like of a user, and in that case, it is desirable to form the sensor attachment apparatus 20 with extendable and retractable materials so that a move of a user is not disturbed. In addition, the attached sensor device 10 may be separated from the target object, and the sensor attachment apparatus 20 may have thickness like a helmet, a protector, and the like do. Additionally, the sensor attachment apparatus 20 may be attached to or be integrally formed with an object such as a golf club, a tennis racket, and a ski board. A user can attach the sensor device 10 to the sensor attachment tool 21 positioned in a place that the user wants to measure.

Figure 2:
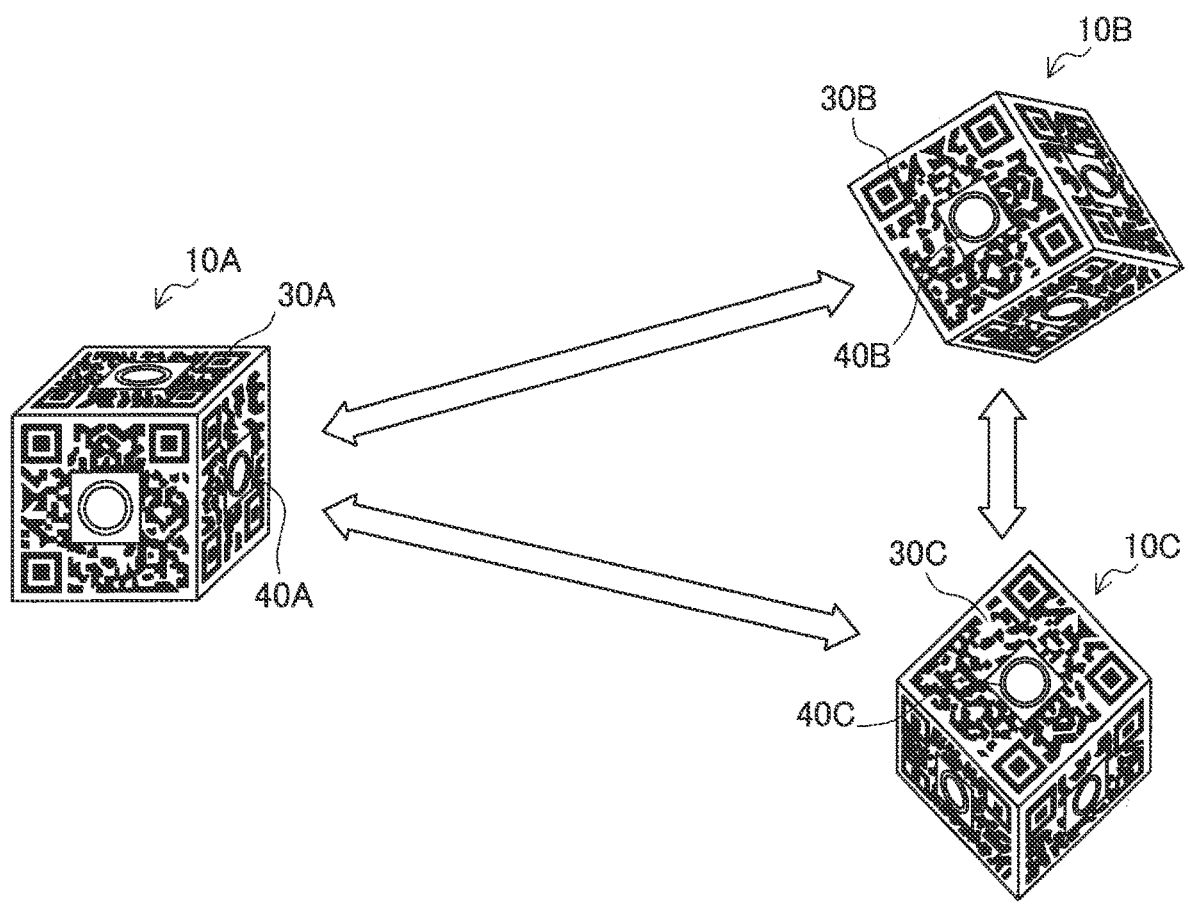
FIG. 2 is an explanatory diagram for describing a mechanism for reducing an accumulated error in position information or attitude information by the sensor system according to the embodiment.

FIG. 2 is an explanatory diagram for describing a mechanism for reducing the accumulated error in the position information or the attitude information described above, in such a sensor system 1. As illustrated in FIG. 2, the shape of the sensor device is a cube, and an information code 30 is formed on each surface thereof so that each information code 30 can be imaged from the outside. The information code may be, for example, a two-dimensional code, a barcode, a QR code (registered trademark), an AR marker, or the like. In addition, a camera 40 that can image the information codes formed on the other sensor device 10 is provided. For example, a camera 40A of the sensor device 10A can image an information code 30B on the sensor device 10B and an information code 30C on the sensor device 10C at the timing when each information code comes into an angle of view.

In other words, the respective sensor devices 10 capture captured images of the information codes on the other sensor devices in addition to measuring the sensor information with the inertial sensor. Once the captured image of the information code is recognized, it is possible to recognize a relative positional relationship (that is, a relative distance) and attitude relationship (that is, a relative angle) between the sensor device 10 that performed imaging and the other sensor device 10 that is the imaging subject. The sensor system 1 according to the present embodiment corrects attitude information and position information computed by an inertial navigation system on the basis of the relative positional relationship and attitude relationship. Such a mechanism enables reduction of accumulated errors in sensors.

Note that the process of correction may be performed in each of the sensor devices 10 or in other devices such as a server. In the present embodiment, an example in which one sensor device 10 (the sensor 10A, for example) collectively performs the process of correction as a master and the other sensor devices 10 (the sensor devices 10B and 10C, for example) operate as slaves is described as an example.

Note that a cube is one example of shapes of the sensor device 10, and the sensor device 10 may be formed into any other shapes. In addition, an information code and a camera may be formed in isolation, and one sensor device 10 is provided with any number of information codes and any number of cameras.

<2.2. Configuration Example of Sensor Device that Operates as Slave>

Figure 3:
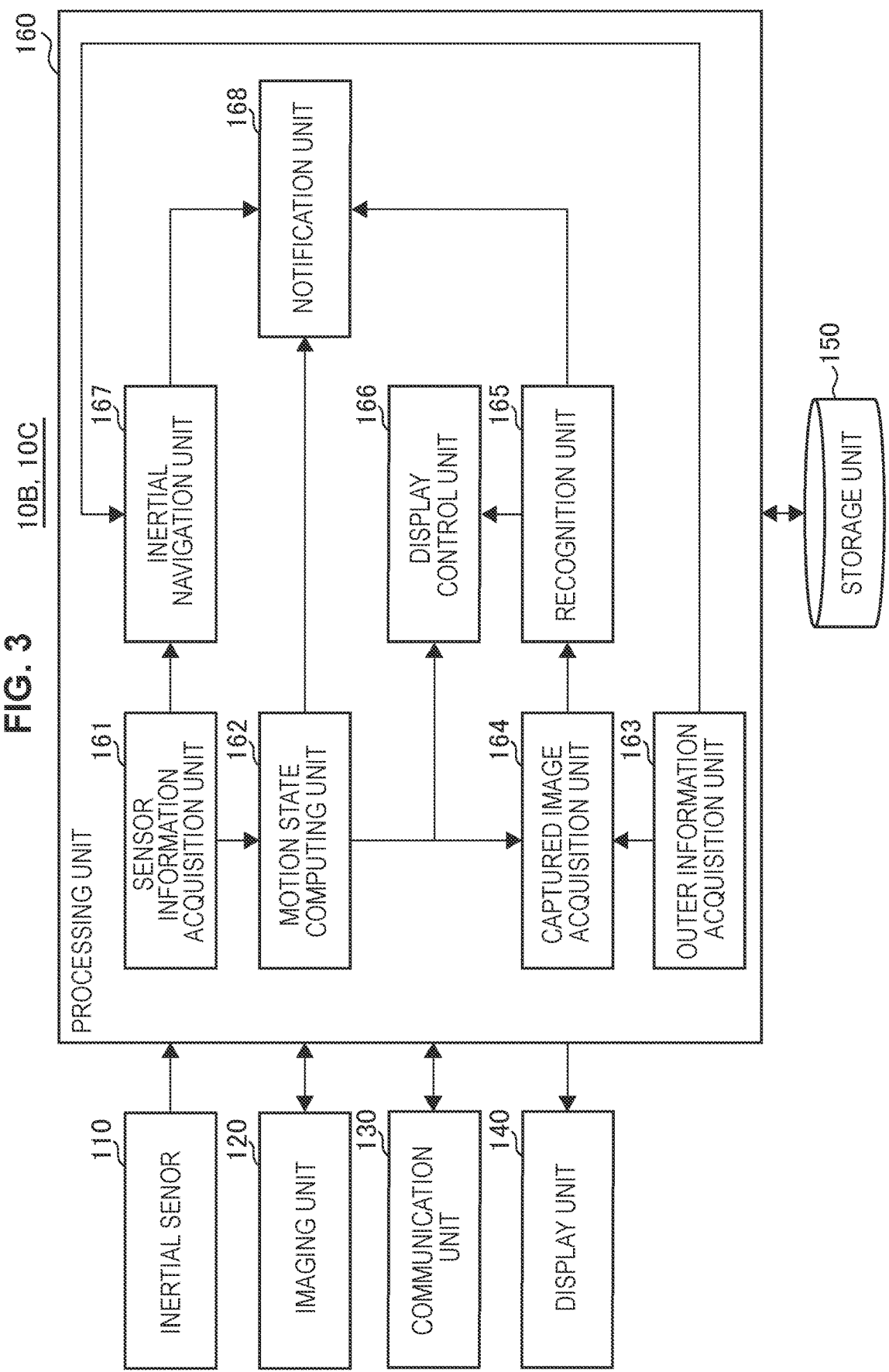
FIG. 3 is a block diagram illustrating an example of a logical configuration of a sensor device according to the embodiment.

FIG. 3 is a block diagram illustrating an example of a logical configuration of the sensor devices 10B and 10C that operate as slaves. The sensor devices 10B and 10C that operate as slaves are simply referred to as the slave 10 in the following description. As illustrated in FIG. 3, the slave 10 includes an inertial sensor 110, an imaging unit 120, a communication unit 130, a display unit 140, a storage unit 150, and a processing unit 160.

The inertial sensor 110 is a device that performs measurement using inertia. The inertial sensor 110 includes an acceleration sensor, a gyro sensor, a geomagnetic sensor, and the like, and outputs the measured sensor information (acceleration and angular velocity, for example) to the processing unit 160. The inertial sensor 110 may be, for example, a MEMS sensor.

The imaging unit 120 is a device that includes a lens system, a driving system that drives the lens system, a solid-state image sensor array that photoelectrically converts the imaging light to be obtained by the lens system to generate an imaging signal, and the like and captures a captured image. The imaging unit 120 corresponds to the camera 40 illustrated in FIG. 2. That is, the imaging unit 120 can image information codes formed on the other sensor device (other slave or master, for example) 10.

The communication unit 130 is a communication module for transmitting and receiving data to and from the other sensor device 10 in a wired/wireless manner. The communication unit 130 can perform communication that is compliant with any communication method such as a local area network (LAN), a wireless LAN, Wi-Fi (registered trademark), Bluetooth (registered trademark), or infrared communication, for example. The communication unit 130 transmits the information measured, imaged, or computed by the slave 10 to the other sensor device 10 and receives the information measured, imaged, or computed by the other sensor device 10.

The display unit 140 is a display device that displays an image. The display unit 140 displays an information code, for example. An information code may be fixedly formed (that is, displayed) or variably formed. The display unit 140 can be realized by a liquid crystal display (LCD), an organic light-emitting diode (OLED), electronic paper, or the like.

The storage unit 150 temporarily or permanently stores programs and various kinds of data for operating the slave 10. For example, the storage unit 150 temporarily stores the information that should be transmitted to the other sensor device 10. In addition, the storage unit 150 stores the information indicating a movement trajectory of the slave 10.

The processing unit 160 corresponds to a CPU, a DSP, or the like, and performs a process for providing various functions of the slave 10. As illustrated in FIG. 3, the processing unit 160 includes a sensor information acquisition unit 161, a motion state computing unit 162, an outer information acquisition unit 163, a captured image acquisition unit 164, a recognition unit 165, a display control unit 166, an inertial navigation unit 167, and notification unit 168. Note that the processing unit 160 can further include other components besides these components. That is, the processing unit 160 can also perform operations other than the operations of these components.

The sensor information acquisition unit 161 acquires the sensor information measured by the inertial sensor 110. The sensor information acquisition unit 161 outputs the acquired sensor information to the motion state computing unit 162 and the inertial navigation unit 167 in association with the measurement time.

The motion state computing unit 162 computes the motion state information indicating a motion state on the basis of the sensor information. The motion state information may be, for example, the speed obtained by integrating acceleration, the attitude obtained by integrating angular velocity, or the acceleration or the angular velocity itself. The motion state computing unit 162 outputs the motion state information to the captured image acquisition unit 164, the display control unit 166, and the notification unit 168 in association with the measurement time of the sensor information.

The outer information acquisition unit 163 acquires the information received by the communication unit 130. For example, the outer information acquisition unit 163 acquires the motion state information of the other sensor device 10 and the information indicating the result of correction by the master. The outer information acquisition unit 163 outputs the motion state information of the other sensor device 10 to the captured image acquisition unit 164. In addition, the outer information acquisition unit 163 outputs the information indicating the result of correction by the master to the inertial navigation unit 167.

The captured image acquisition unit 164 acquires a captured image from the imaging unit 120. The captured image acquisition unit 164 can control the imaging timing of the imaging unit 120. For example, the captured image acquisition unit 164 causes the imaging unit 120 to perform imaging at the timing when the information codes on the other sensor device 10 come into the angle of view. Furthermore, the captured image acquisition unit 164 may control the imaging timing on the basis of the motion state information of the slave 10 and/or the motion state information of the other sensor device 10. For example, the captured image acquisition unit 164 causes the imaging unit 120 to image the information codes formed on the other sensor device 10 in a case where magnitude of motion of the slave 10 or the other sensor device 10 (an individual speed, for example) or relative magnitude of motion of the slave 10 or the other sensor device 10 (a relative speed, for example) falls below a threshold. This can reduce blurriness in the captured image resulting from a camera shake or an imaging subject shake and prevent deterioration in recognition precision by the recognition unit 165 to be described later. The captured image acquisition unit 164 outputs the acquired captured image to the recognition unit 165.

The recognition unit 165 acquires relative relationship information indicating at least one of a relative distance and attitude related to the slave 10 and the other sensor device 10. For example, the recognition unit 165 recognizes a relative relationship between the slave 10 and the other sensor device 10 on the basis of the captured images of the information codes on the other sensor device 10 imaged by the imaging unit 120 (that is, displayed on the display unit 140 of the other sensor device 10). Specifically, the recognition unit 165 recognizes the relative distance from the magnitude of the information code included in the captured image and recognizes the relative attitude from the attitude of the information code included in the captured image. For example, the information code may be an AR marker, and the algorithm for estimating the position and the attitude of an AR marker is explained in detail in "Hirokazu Kato. Mark Billinghurst, Koichi Asano, and Keihachiro Tachibana: An Augmented Reality System and its Calibration based on Marker Tracking, TVRSJ, Vol. 4, No. 4, 1999," for example. Information codes include identification information for identifying each of the sensor devices 10 and the recognition unit 165 can specify with which sensor device 10 the recognized relative relationship information indicates a relative relationship. Note that the relative distance from among the relative relationship information may be recognized on the basis of the communication result (arrival time of radio waves, for example) between the sensor device 10 and the other sensor device 10. Ultra wide band (UWB) can be used for such radio waves, for example. In that case, the communication unit 130 included in each of the sensor devices 10 transmits and receives radio waves that are compliant with the UWB. The recognition unit 165 outputs the recognized relative relationship information to the display control unit 166 and the notification unit 168. Note that recognition means of a relative distance using wireless signals is not limited to a means using UWB, like standardization of 802.11 az is being considered as a wireless technology that can measure distance, for example.

The display control unit 166 controls display by the display unit 140. For example, the display control unit 166 controls the information code to be displayed by the display unit 140 on the basis of the motion state information and/or the relative relationship information so that the information code is easily recognized by the other sensor device 10. Specifically, the display control unit 166 causes the display unit 140 to display an information code in which space frequency is small in the same direction as the direction in which the slave 10 moves and space frequency is large in another direction. FIG. 4 is a diagram illustrating an example of an information code to be displayed by such control. For example, in a case where the slave 10 is moving in an X direction, the display unit 140 displays an information code 30D in which space frequency is small in the X direction and space frequency is large in a Y direction. This can reduce the effect of blurriness in the X direction which can be caused when the other sensor device 10 images the information code 30D and prevent deterioration in the recognition precision of the relative relationship information in the other sensor device 10. On the other hand, in a case where the slave 10 is moving in the Y direction, the display unit 140 displays an information code 30E in which space frequency is small in the Y direction and space frequency is large in the X direction. Similarly, in this case, deterioration in the recognition precision of the relative relationship information in the other sensor device 10 can be prevented. From a similar point of view, the display control unit 166 may cause the display unit 140 to display an information code in which space frequency is small in the same direction as the direction in which the slave 10 moves relatively with the other sensor device 10 as a reference and space frequency is large in another direction. In this case, a move of the other sensor device 10 is also taken into consideration; therefore, deterioration in the recognition precision of the relative relationship information in the other sensor device 10 can be further prevented. In addition, in a case where the behavior of the user wearing the sensor device 10 is predictable, the display unit 166 may perform display control of the information code in conformity with the prediction of the behavior of the user. For example, in a case where a user is playing tennis, the display control unit 166 may display an information code in which space frequency is small in the direction same as the trajectory of the swing. In this case, deterioration in the recognition precision of the relative relationship information in the other sensor device 10 can be further prevented. For the prediction of the behavior of the user, for example, a kind of sports and the like may be input by the user or the prediction model may be learned.

The inertial navigation unit 167 computes the position information and the attitude information of the slave 10 by an inertial navigation system on the basis of the sensor information. Here, in a case where the outer information acquisition unit 163 outputs the information indicating the result of correction by the master, the inertial navigation unit 167 reflects the information indicating the result of correction. Specifically, the inertial navigation unit 167 overwrites the position information and the attitude information of the slave 10 itself with the corrected position information and attitude information. This reduces the accumulated errors included in the subsequent computing results. The inertial navigation unit 167 outputs the computed position information and attitude information to the notification unit 168.

The notification unit 168 notifies the other sensor device 10 of at least one of the sensor information measured by the inertial sensor 110, the captured image captured by the imaging unit 120, and the computing results based on these, in association with the measurement time or the imaging time. The notification unit 168 performs this notification through the communication unit 130. Note that the information indicating the computing results based on the sensor information or the captured image is at least one of the relative relationship information, the motion state information, the position information, and the attitude information. These notifications enable the process of correction in the master. In addition, these notifications enable, in the other sensor device 10, the control of the imaging timing based on the move of the slave 10 and the display control of the information codes.

<2.3. Configuration Example of Sensor Device that Operates as Master>

Figure 5:
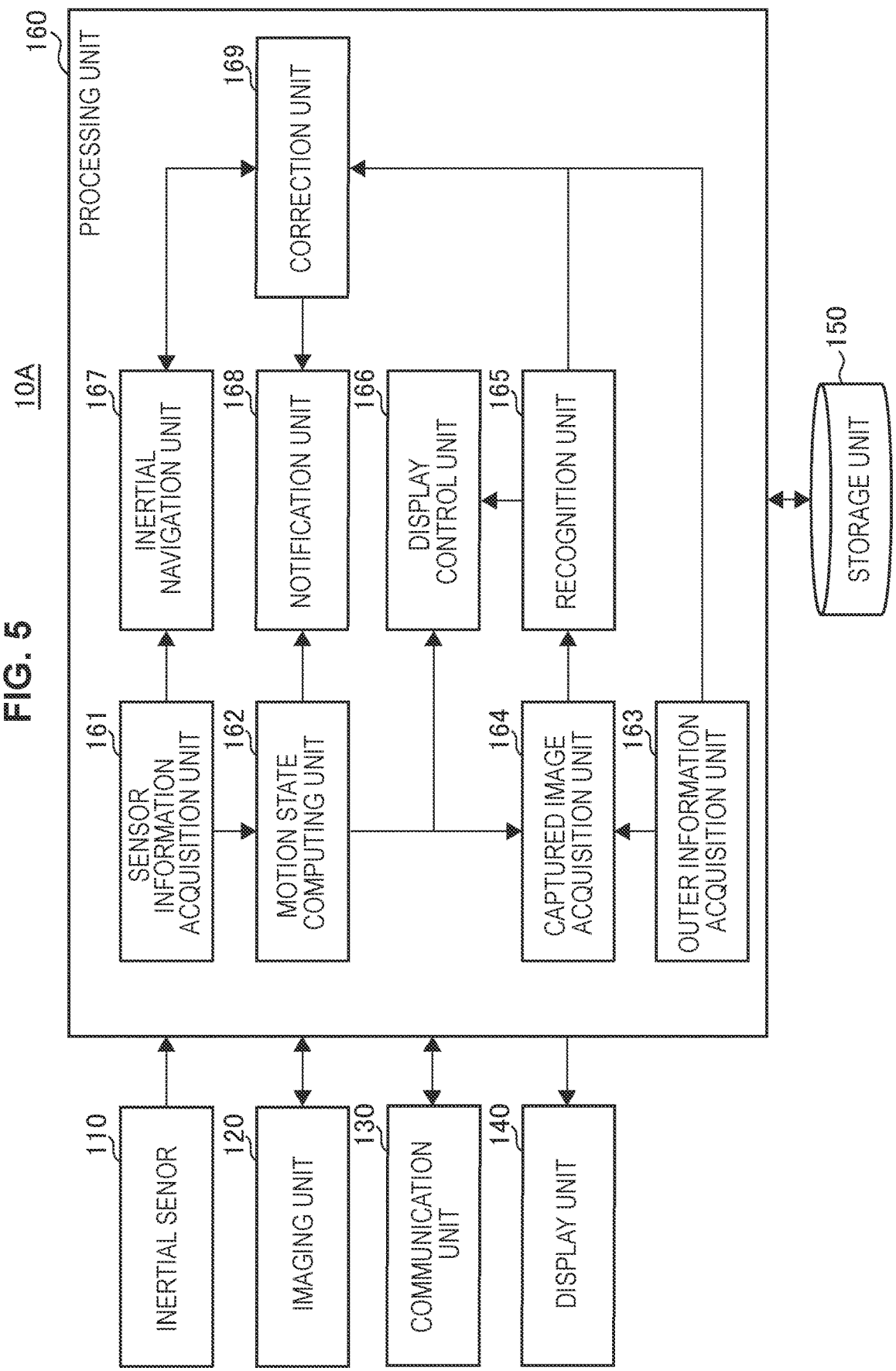
FIG. 5 is a block diagram illustrating an example of a logical configuration of the sensor device according to the embodiment.

FIG. 5 is a block diagram illustrating an example of a logical configuration of the sensor device 10A that operates as a master. The sensor device 10A that operates as a master is simply referred to as the master 10 in the following description. As illustrated in FIG. 5, the master 10 includes the inertial sensor 110, the imaging unit 120, the communication unit 130, the display unit 140, the storage unit 150, and the processing unit 160.

Note that the functions of the inertial sensor 110, the imaging unit 120, the communication unit 130, the display unit 140, and the storage unit 150 are similar to those of the slave 10. In the above description related to the slave 10, the slave 10 can be read as the master 10 and the other sensor device 10 can be read as the sensor device 10 that operates as a slave.

The processing unit 160 corresponds to a CPU, a DSP, or the like, and performs a process for providing various functions of the master 10. As illustrated in FIG. 5, the processing unit 160 includes the sensor information acquisition unit 161, the motion state computing unit 162, the outer information acquisition unit 163, the captured image acquisition unit 164, the recognition unit 165, the display control unit 166, the inertial navigation unit 167, the notification unit 168, and a correction unit 169. Note that the processing unit 160 can further include other components besides these components. That is, the processing unit 160 can also perform operations other than the operations of these components.

Note that the functions of the sensor information acquisition unit 161, the motion state computing unit 162, the outer information acquisition unit 163, the captured image acquisition unit 164, the recognition unit 165, the display control unit 166, the inertial navigation unit 167, and the notification unit 168 are similar to those of the slave 10. In the above description related to the slave 10, the slave 10 can be read as the master 10 and the other sensor device 10 can be read as the sensor device 10 that operates as a slave. The following describes a part that differs from the slave 10.

The outer information acquisition unit 163 acquires the motion state information, the relative relationship information, the position information, and the attitude information of the other sensor device 10. Here, the relative relationship information acquired from the other sensor device 10 may be the relative relationship information related to the other sensor device 10 and the master 10 that is recognized on the basis of the captured image of the information code of the master 10 captured by the other sensor device 10. In addition, relative relationship information acquired from the other sensor device 10 may be the relative relationship information between the other sensor devices 10 that is recognized on the basis of the captured image of the information code of still another sensor device 10 captured by the other sensor device 10. The outer information acquisition unit 163 outputs the motion state information of the other sensor device 10 to the captured image acquisition unit 164. In addition, the outer information acquisition unit 163 outputs the relative relationship information, the position information, and the attitude information of the other sensor device 10 to the correction unit 169.

The recognition unit 165 outputs the recognized relative relationship information to the display control unit 166 and the correction unit 169.

The inertial navigation unit 167 computes the position information and the attitude information of the slave 10 by an inertial navigation system on the basis of the sensor information. In addition, the inertial navigation unit 167 reflects the information indicating the result of correction by the correction unit 169. Specifically, the inertial navigation unit 167 overwrites the position information and the attitude information of the master 10 itself with the corrected position information and attitude information. This reduces the accumulated errors included in the subsequent computing results. The inertial navigation unit 167 outputs the computed position information and attitude information to the correction unit 169.

The information indicating the result of correction by the correction unit 169 is included in the information indicating the computing results based on the sensor information or the captured image from among the information whose notification is performed by the notification unit 168. This enables reflection of the result of correction in the other sensor device 10.

The correction unit 169 corrects the integral value computed from the sensor information on the basis of the relative relationship information. This integral value may be the position information computed on the basis of the angular velocity and the acceleration. In this case, the accumulated error included in the position information can be reduced. In addition, this integral value may be the attitude information computed on the basis of the angular velocity. In this case, the accumulated error included in the attitude information can be reduced. First, the correction unit 169 corrects the integral value computed from the sensor information measured by the inertial sensor 110, that is, the result of computing by the inertial navigation unit 167 of the master 10 itself. This can reduce the accumulated errors included in the position information and the attitude information of the master 10 itself. The correction unit 169 outputs the information indicating the result of correction to the inertial navigation unit 167. In addition, second, the correction unit 169 corrects the integral value computed from the sensor information measured by the other sensor device 10, that is, the result of computing by the inertial navigation unit 167 of the other sensor device 10. This can reduce the accumulated errors included in the position information and the attitude information of the other sensor device 10. The correction unit 169 outputs the information indicating the result of correction to the notification unit 168. In the following description, specific description for the process of correction will be given with reference to FIG. 6.

Figure 6:
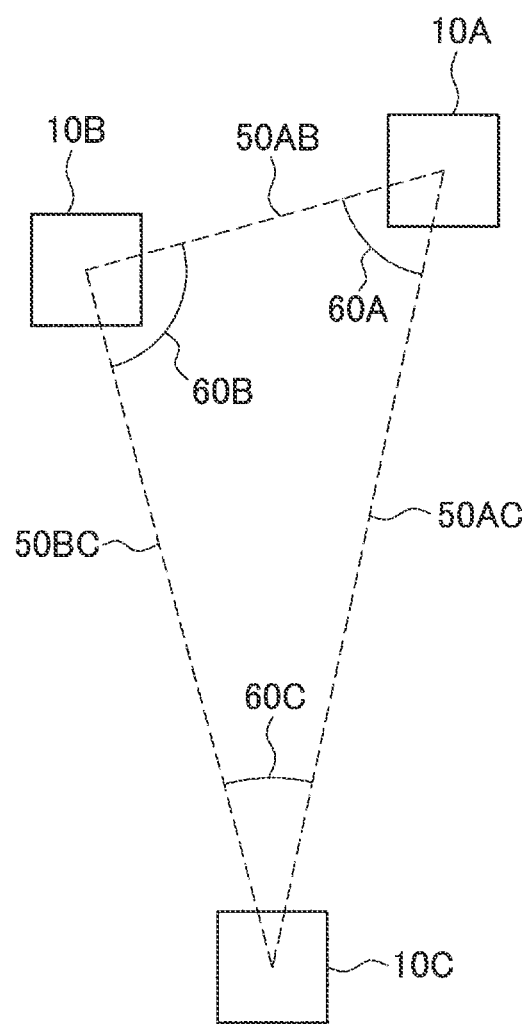
FIG. 6 is an explanatory diagram for describing an example of a process of correction by the sensor system according to the embodiment.

FIG. 6 is an explanatory diagram for describing an example of a process of correction by the sensor system 1 according to the present embodiment. The example illustrated in FIG. 6 is an example of correction based on the triangle formed by the three sensor devices 10.

A user wears a plurality of sensor devices. The sensor system 1 (the correction unit 169, for example) performs the process of correction using the triangle arrangement in space formed by any three sensor devices 10 of the plurality of sensor devices 10 worn by a user. In this method, the sensor system 1 uses two triangles. The first triangle is formed continuously with the inertial sensor every moment. The second triangle is formed intermittently with the image sensor. The sensor system 1 corrects accumulated errors by correcting the continuous triangle by the inertial sensor with the intermittent triangle by the image sensor.

First, the forming method of the first triangle using the inertial sensor will be described. First, the sensor system 1 performs initial setting at the beginning. The user will go into a stationary state after wearing the sensor devices 10. The sensor system 1, in this stationary state, decides the initial positions of the space coordinates of the three sensor devices 10 arranged at the respective vertices of the triangle. Regarding this, the user may manually set the space coordinates or the sensor system 1 may decide the space coordinates with known methods such as other image processing.

After starting a motion capture operation, the sensor system 1 performs updating every moment by computing the positions and the attitude angles of the sensor devices 10 at the vertices of the triangles, on the basis of the sensor information of the inertial sensor obtained every moment. In this case, the sensor device 10A is decided to be a reference point, for example, and triangles with the point as the starting point are continued to be formed continuously on a constant basis.

Next, the forming method of the second triangle using the image sensor will be described. By the image sensor, the length (that is, a relative distance) of a side 50AB connecting the sensor devices 10A and 10B is also obtained as the relative relationship information related to the sensor devices 10A and 10B. The length of a side 50BC connecting the sensor devices 10B and 10C is also obtained by the relative relationship information related to the sensor devices 10B and 10C. The length of a side 50AC connecting the sensor devices 10A and 10C is also obtained by the relative relationship information related to the sensor devices 10A and 10C. The length of the three sides of the triangle is obtained in this way. As a matter of course, a wireless distance-measuring technology such as UWB may be used for the acquisition of the length of the three sides. In addition, similarly from the image recognition result, angles 60A, 60B, and 60C are obtained. The sensor system 1 can form triangles in space on the basis of the length of the three sides and the relative angle. For example, by deciding the sensor device 10A to be a reference point, triangles with the point as a starting point are obtained. The information code is hidden in some cases; therefore, the triangles are the information obtained intermittently.

The triangles obtained from the image sensor are intermittent, but they do not accumulate errors because of the characteristics of the image recognition. On the other hand, the triangles obtained from the inertial sensor are continuous but accumulate errors because of the characteristics of the inertial sensor. Therefore, the sensor system 1 can continue the continuous motion capture operation and reset the accumulation in errors intermittently by overwriting and updating the triangle information obtained from the inertial sensor with the triangle information obtained intermittently from the image sensor.

In addition, the sensor system 1 may correct a part of the attitude angle information of the continuous triangles obtained from the inertial sensor using the characteristic that the angles 60A, 60B, and 60C are found from the condition that the sum of the interior angles is 180 degrees.

To sum up, it is assumed that the correction unit 169 fixes one of the sensor devices 10A, 10B, or 10C as a reference point (that is, the position information and the attitude information are not corrected), and the other sensor device 10 is positioned to a position where the above length of each side and the angles of the triangle that are found out are realized (that is, the position information and the attitude information are corrected). Note that a triangle was formed by adopting the length of the three sides of the triangle from the relative relationship information in the above; however, a triangle may be formed, for example, by adopting the length of two sides and the angle between the sides (that is, a relative angle) or the length of one side and the angles at both ends from the relative relationship information.

Note that, because of the characteristics of the inertial sensor, the accumulated error per unit time in the position information is far larger than that in the attitude angle information; therefore, in a case where the usage of the sensor system 1 is short-time motion capture, it can also be said that correcting only the position information is sufficient. In that case, the sensor system 1 can correct the coordinate position of each vertex only for a short time by restricting or correcting the length of the three sides of the triangles formed continuously by the inertial sensor on the basis of the length of the three sides obtained by a wireless distance-measuring technology such as UWB. In this case, the sensor device 10 need not include the imaging unit 120 or the display unit 140, and in place of that, the communication unit 130 needs to include a wireless interface such as UWB that can measure distance.

In addition, in a case where the behavior of the user wearing the sensor devices 10 is predictable, the correction unit 169 may perform correction in accordance with the predicted behavior of the user. For example, the correction unit 169 corrects the position information and the attitude information so that no large deviation occurs from an action model on the basis of the action model of a human body skeleton that is created beforehand and specialized in each sport. This move model can include, for example, information indicating time-series change of a position of the joint, a move of the joint, a move of the limbs, twisting of the body, movement of the center of gravity, and the like in various actions of each sport. Such an action model can be learned on the basis of the accumulation of the measurement results of the action of the user wearing the sensor device 10 at each of the joint positions, for example.

<2.4. Flow of Process>
(1) Overall Flow of Process

Figure 7:
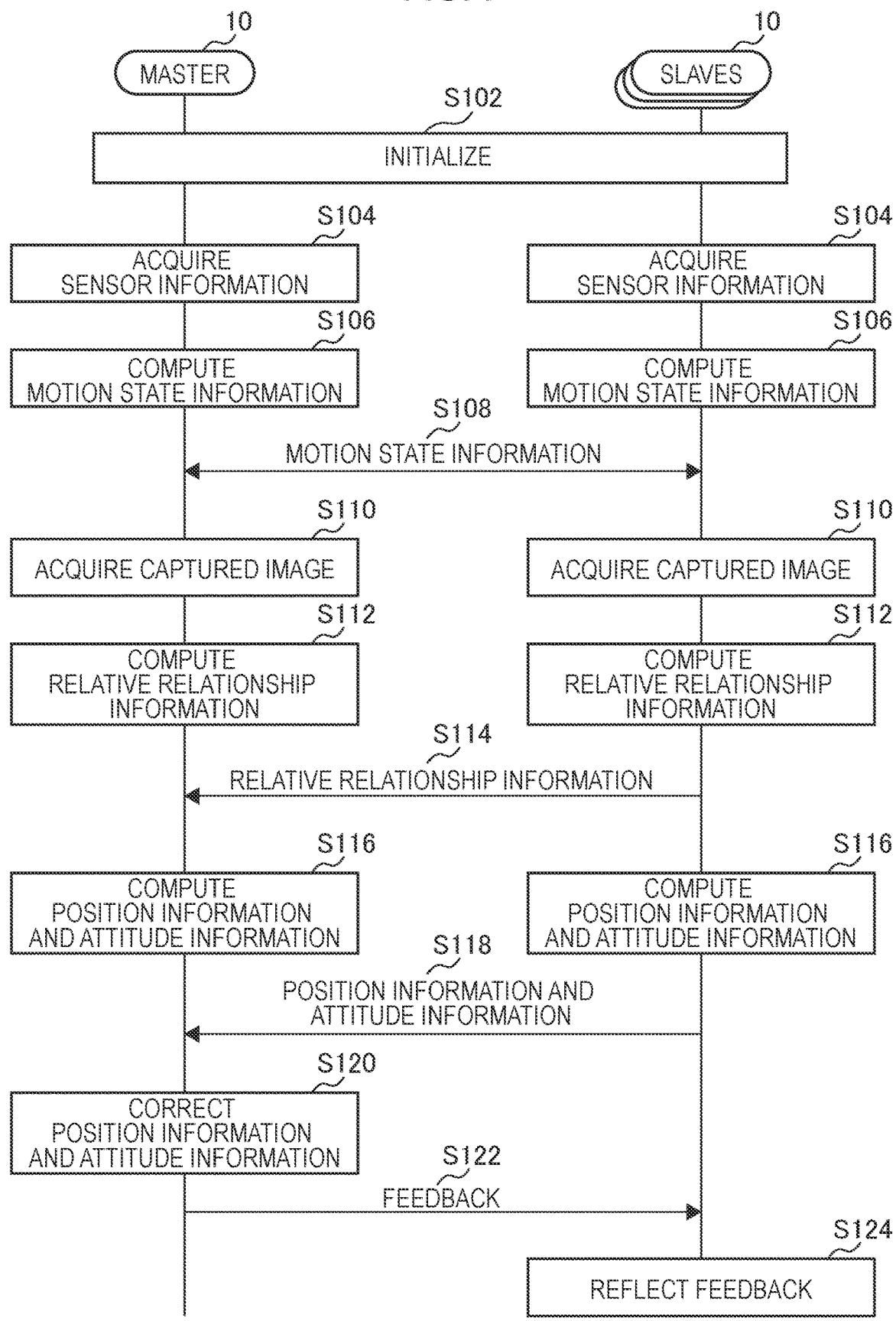
FIG. 7 is a sequence diagram illustrating an example of a flow of a process to be executed in the sensor system according to the embodiment.

FIG. 7 is a sequence diagram illustrating an example of a flow of a process to be executed in the sensor system 1 according to the present embodiment. The master 10 and a plurality of the slaves 10 are involved in this sequence.

First, the master 10 and the slaves 10 initialize the position and the attitude in the inertial navigation system (step S102). Next, the master 10 and the slaves 10 each acquire the sensor information (step S104) and compute (step S106) and share (step S108) the motion state information. Here, the motion state information is also shared between the slaves 10.

Next, the master 10 and the slaves 10 acquire the captured images (step S110) and compute the relative relationship information on the basis of the acquired captured images (step S112). The slaves 10 notify the master 10 of the computed relative relationship information (step S114). The relative relationship information that the master 10 is notified of at this time includes the relative relationship information related to the slaves 10 and the master 10 and the relative relationship information between the slaves 10. Note that, although the details are omitted in the sequence, display control of the information codes and control of the imaging timing are performed in the master 10 and the sensor devices 10 on the basis of the motion state information and/or the relative relationship information.

Next, the master 10 and the slaves 10 each compute the position information and the attitude information by an inertial navigation system on the basis of the sensor information (step S116). The slaves 10 notify the master 10 of the computed position information and attitude information (step S118).

Then, the master 10 corrects the position information and the attitude information computed by itself or collected from the slaves 10 on the basis of the relative relationship information (step S120). The master 10 gives feedback on the information indicating the result of correction (step S122), and each of the slaves 10 reflects the feedback in its position information and attitude information (step S124).

This is the end of the process. Note that the process according to steps S104 to S124 described above may be repeatedly performed or asynchronously performed.

(2) Control Process of Imaging Timing

Figure 8:
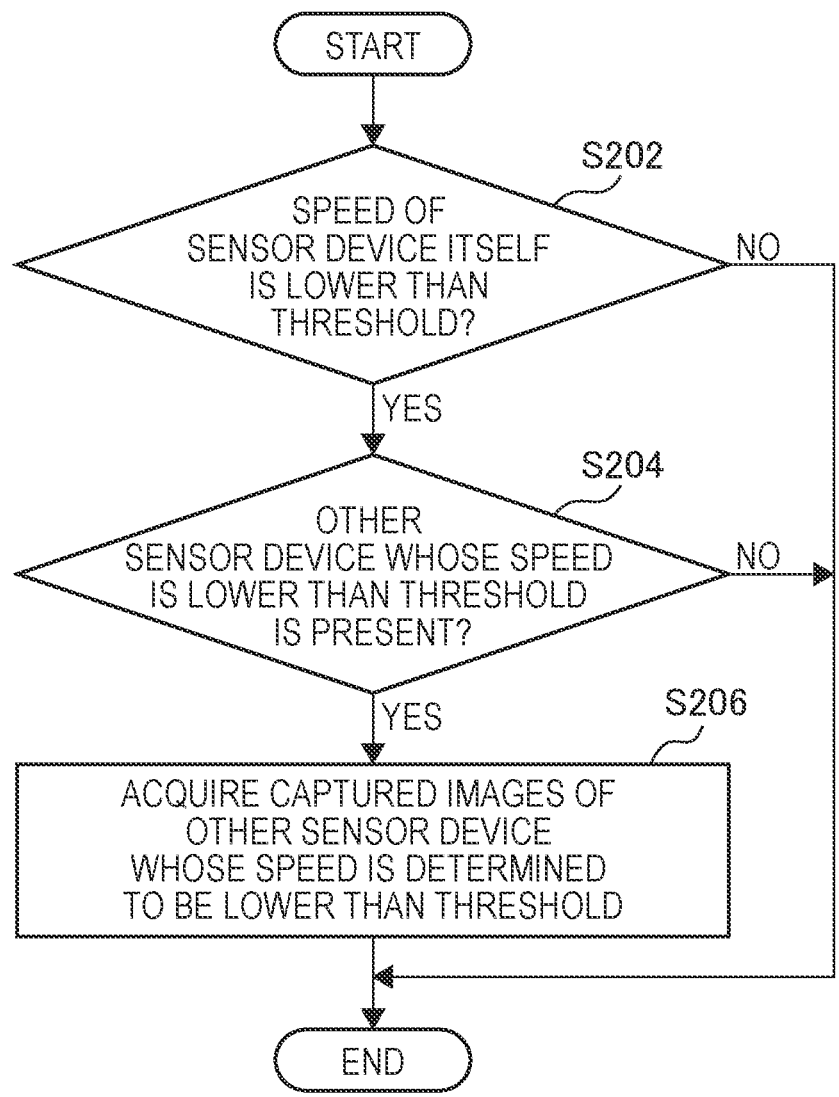
FIG. 8 is a flowchart illustrating an example of a flow of a control process of imaging timing to be executed in the sensor device according to the embodiment.

FIG. 8 is a flowchart illustrating an example of a flow of a control process of imaging timing to be executed in the sensor device 10 according to the present embodiment. Note that the process to be described here is a detailed version of the process of step S110 in the sequence described above with reference to FIG. 7.

First, the captured image acquisition unit 164 determines whether the speed of the sensor device 10 itself is below a threshold or not on the basis of the motion state information of the sensor device 10 itself (step S202). In addition, the captured image acquisition unit 164 determines whether the other sensor device 10 whose speed is lower than a threshold is present or not on the basis of the motion state information of the other sensor device 10 (step S204). The thresholds in the respective steps may match with each other or differ from each other.

In a case where it is determined that the speed of the sensor device 10 itself is lower than the threshold and the other sensor device 10 whose speed is lower than the threshold is present (step S202/YES and step S204/YES), the captured image acquisition unit 164 acquires the captured image of the other sensor device 10 whose speed is determined to be lower than the threshold. For example, the captured image acquisition unit 164 outputs the imaging instruction to the imaging unit 120 and acquires the captured image from the imaging unit 120 at the timing when the other sensor device 10 whose speed is determined to be lower than the threshold comes into the angle of view.

In a case where it is determined that the speed of the sensor device 10 itself is not lower than the threshold or it is determined that the other sensor device 10 whose speed is lower than the threshold is absent (step S202/NO or step S204/NO), the captured image acquisition unit 164 does not acquire the captured image.

This is the end of the process.

<2.5. Comparison with Other Methods>

Figure 9:
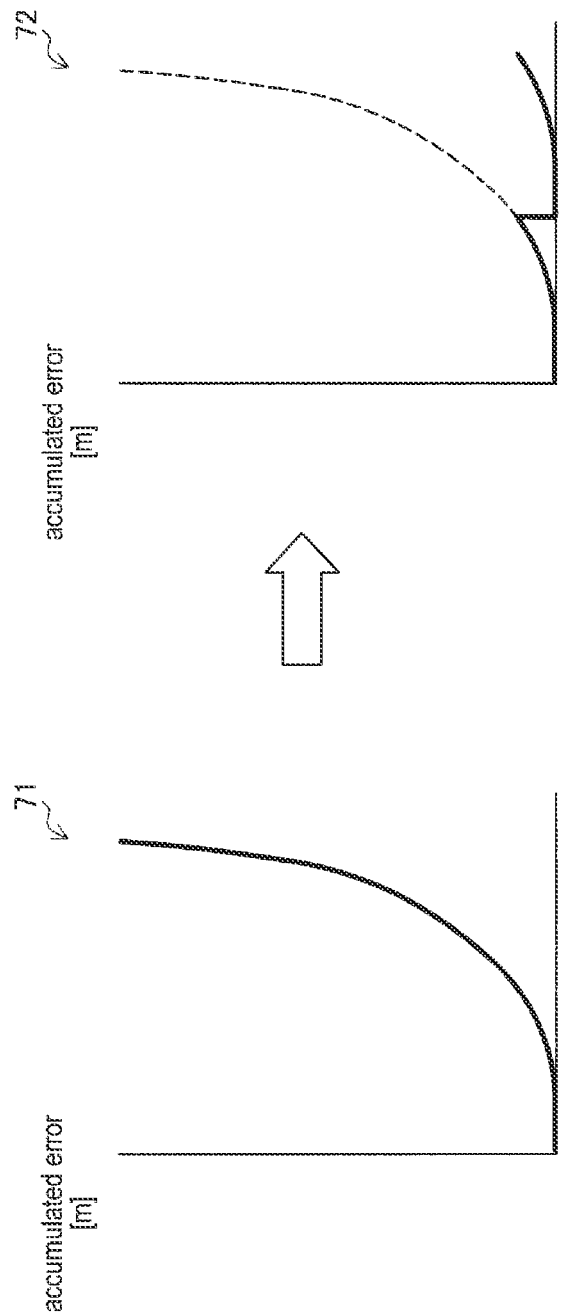
FIG. 9 illustrates an example in which an accumulated error is reduced by a process of correction by the sensor system according to the embodiment.

In the above, the sensor system 1 according to the present embodiment has been described in detail. As described above, the sensor system 1 according to the present embodiment can reduce an accumulated error in an inertial navigation system by the process of correction based on the relative relationship between the sensor devices 10 computed separately. FIG. 9 illustrates an example in which an accumulated error is reduced by such a process of correction. The left part (symbol 71) of FIG. 9 illustrates that the accumulated error in position information exponentially grows in a case where no process of correction is performed. The right part (symbol 72) of FIG. 9 illustrates that the accumulated error in position information is reduced as necessary in a case where the process of correction is performed. The timing of this reduction is, for example, the timing in which relative relationship information related to the plurality of sensor devices 10 agrees with each other. As illustrated in FIG. 9, according to the present technology, an accumulated error can be reduced as necessary; therefore, measurement maintaining precision can be realized even with a consumer MEMS sensor that is at a low price and has low precision.

A technology for visualizing a move of the body of a user is known as, for example, a motion capture technology. As its one method, there is a technology in which a user wears a full-body suit and attaches an industrial sensor to each of the joints and a move of the body is visualized (that is, the position information of the sensors is estimated) on the basis of the known distance between the sensors and attitude information in which an accumulated error is comparatively small. For example, a forward kinematics method, an inverse kinematics method, and the like are included in such a technology. However, in such methods, information of the angles related to all the joints is required and a user is required to wear a heavy suit. In contrast, these requirements are not imposed in the technology according to the present embodiment, and thus the technology can be said as an easy mechanism compared with the above motion capture technology. There is another method in which a fixedly installed infrared sensor is used; however, the apparatus setting is complicated and using an infrared sensor outside has been difficult because it uses infrared rays. In contrast, the technology according to the present technology does not require fixed apparatuses and can also be used outside because it uses captured images. In addition, in a case where an infrared sensor is used, the speed responsiveness depends on the frame rate of the infrared sensor (an infrared camera, for example). In contrast, in the technology according the present embodiment, correction can depend on the frame rate of the imaging unit 120; however, the position information and the attitude information are computed on the basis of the measurement results of the inertial sensor, and therefore, the speed responsiveness is higher compared with the case in which an infrared sensor is used. That is, the technology according to the present embodiment can properly measure a fast move in sports.

3. Second Embodiment

The present embodiment is an embodiment in which computing based on sensor information is performed in an information processing device other than the sensor device. Here, description will be given as computing is performed in a server 80 to be described later.

<3.1. Configuration Example of Sensor Device>

Figure 10:
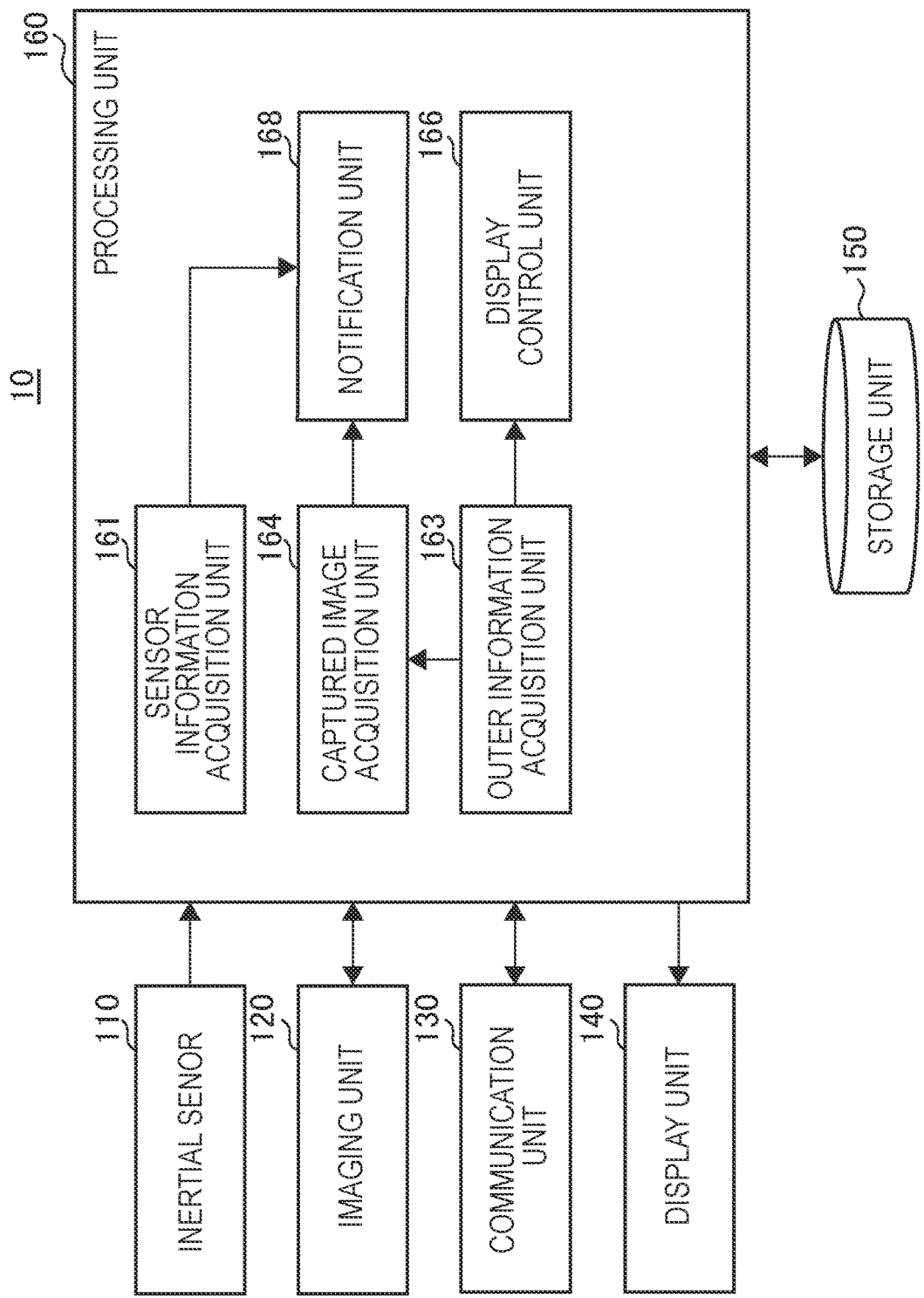
FIG. 10 is a block diagram illustrating an example of a logical configuration of a sensor device according to a second embodiment.

FIG. 10 is a block diagram illustrating an example of a logical configuration of the sensor device 10 according to the present embodiment. As illustrated in FIG. 10, the sensor device 10 includes the inertial sensor 110, the imaging unit 120, the communication unit 130, the display unit 140, the storage unit 150, and the processing unit 160.

The functions of the inertial sensor 110, the imaging unit 120, the communication unit 130, the display unit 140, and the storage unit 150 are as described in the first embodiment.

The processing unit 160 corresponds to a CPU, a DSP, or the like, and performs a process for providing various functions of the master 10. As illustrated in FIG. 10, the processing unit 160 includes the sensor information acquisition unit 161, the outer information acquisition unit 163, the captured image acquisition unit 164, the display control unit 166, and the notification unit 168. Note that the processing unit 160 can further include other components besides these components. That is, the processing unit 160 can also perform operations other than the operations of these components.

The function of each component included in the processing unit 160 is as described in the first embodiment. The following describes a part that differs from the first embodiment.

The sensor information acquisition unit 161 outputs the sensor information to the notification unit 168 in association with the measurement time.

The outer information acquisition unit 163 acquires information from the server 80. For example, the outer information acquisition unit 163 acquires the motion state information and the relative relationship information of the sensor device 10 itself. In addition, the outer information acquisition unit 163 acquires the motion state information of the other sensor device 10. The outer information acquisition unit 163 outputs the motion state information of the sensor device 10 itself and the other sensor device 10 to the captured image acquisition unit 164. In addition, the outer information acquisition unit 163 outputs the motion state information of the sensor device 10 itself and the relative relationship information of the sensor device 10 itself to the display control unit 166.

The captured image acquisition unit 164 controls the imaging timing on the basis of the motion state information of the sensor device 10 itself and/or the motion state information of the other sensor device 10 acquired from the outer information acquisition unit 163. The captured image acquisition unit 164 outputs the acquired captured image to the notification unit 168.

The display control unit 166 controls the information code to be displayed by the display unit 140 on the basis of the motion state information and/or the relative relationship information acquired from the outer information acquisition unit 163.

The notification unit 168 notifies the server 80 of the sensor information acquired from the sensor information acquisition unit 161 in association with the measurement time and of the captured image acquired from the captured image acquisition unit 164 in association in association with the imaging time.

<3.2. Configuration Example of Server>

Figure 11:
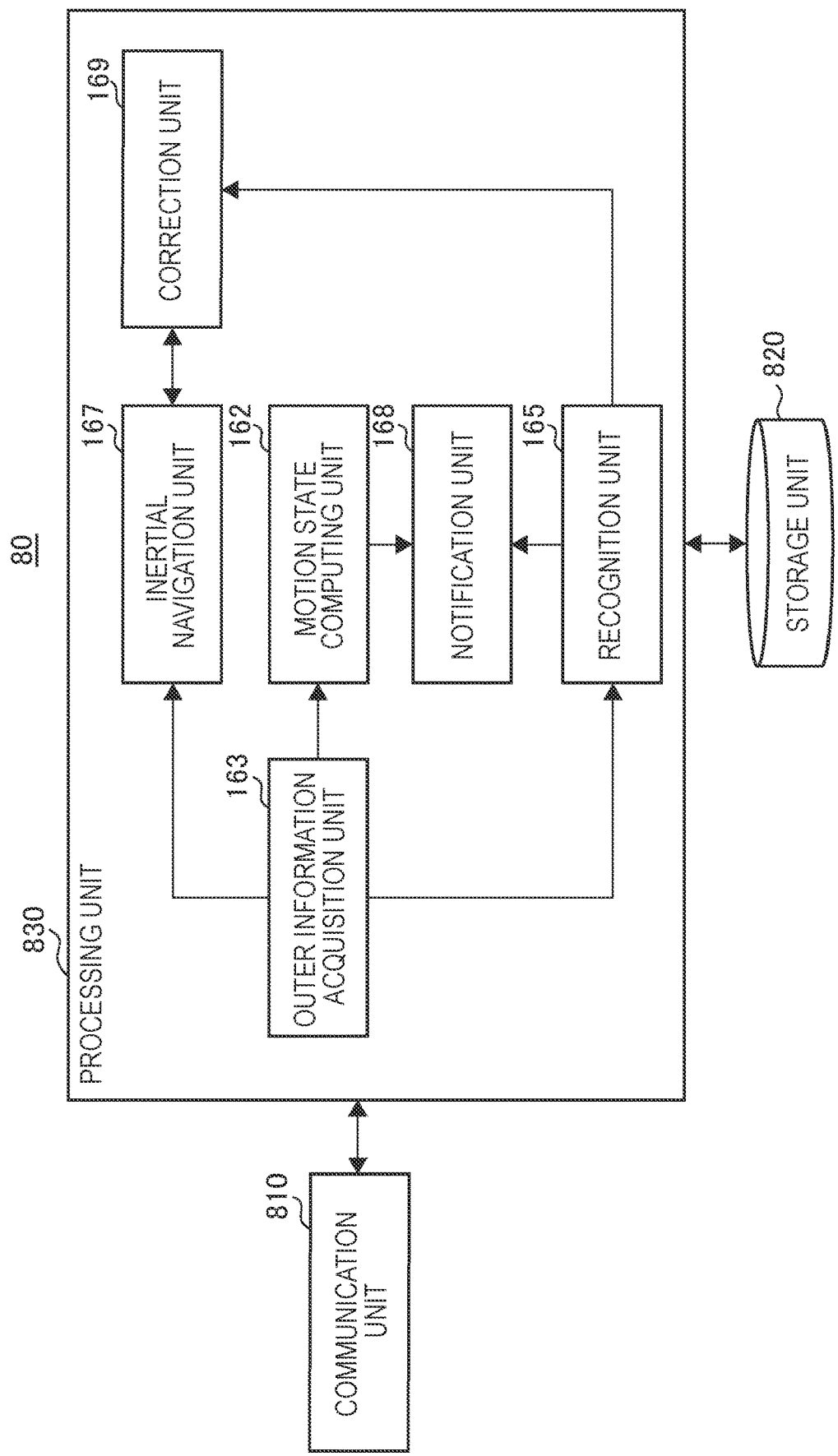
FIG. 11 is a block diagram illustrating an example of a logical configuration of a server according to the embodiment.

FIG. 11 is a block diagram illustrating an example of a logical configuration of the server 80 according to the present embodiment. As illustrated in FIG. 11, the server 80 includes a communication unit 810, a storage unit 820, and a processing unit 830.

The communication unit 810 is a communication module for transmitting and receiving data to and from the sensor devices 10 in a wired/wireless manner. The communication unit 810 can perform communication that is compliant with an optional communication method such as a LAN, a wireless LAN, Wi-Fi, Bluetooth, or infrared communication, for example. The communication unit 810 receives the sensor information and the captured images from the sensor device 10 and transmits the information indicating the computing results based on those to the sensor device 10.

The storage unit 820 temporarily or permanently stores programs and various kinds of data for operating the server 80. For example, the storage unit 820 temporarily stores the information that should be transmitted to the sensor device 10. In addition, the storage unit 150 stores the information indicating a movement trajectory of the sensor device 10.

The processing unit 830 corresponds to a CPU, a DSP, or the like, and performs a process for providing various functions of the server 80. As illustrated in FIG. 11, the processing unit 830 includes the outer information acquisition unit 163, the motion state computing unit 162, the recognition unit 165, the inertial navigation unit 167, the notification unit 168, and the correction unit 169. Note that the processing unit 830 can further include other components besides these components. That is, the processing unit 830 can also perform operations other than the operations of these components.

The function of each component included in the processing unit 830 is as described in the first embodiment. The following describes a part that differs from the first embodiment.

The outer information acquisition unit 163 acquires information from the sensor device 10. For example, the outer information acquisition unit 163 acquires the sensor information measured in each of the sensor devices 10 and the captured images captured in each of the sensor devices 10. The outer information acquisition unit 163 outputs the sensor information to the motion state computing unit 162 and the inertial navigation unit 167 and outputs the captured images to the recognition unit 165.

The motion state computing unit 162 computes the motion state information of each of the sensor devices 10 on the basis of the sensor information measured in each of the sensor devices 10. The motion state computing unit 162 outputs the motion state information to the notification unit 168.

The recognition unit 165 computes the relative relationship information related to each of the sensor devices 10 on the basis of the captured images captured in each of the sensor devices 10. The recognition unit 165 outputs the relative relationship information to the notification unit 168 and the correction unit 169.

The notification unit 168 notifies each of the sensor devices 10 of the motion state information and the relative relationship information.

The inertial navigation unit 167 computes the position information and the attitude information of each of the sensor devices 10 by an inertial navigation system on the basis of the sensor information measured in each of the sensor devices 10. In addition, the inertial navigation unit 167 reflects the information indicating the result of correction by the correction unit 169 related to each of the sensor devices 10. The inertial navigation unit 167 outputs the computed position information and attitude information to the correction unit 169.

The correction unit 169 corrects the position information and the attitude information of each of the sensor devices 10 on the basis of the relative relationship information. The correction unit 169 outputs the information indicating the result of correction to the inertial navigation unit 167.

<3.3. Flow of Process>

Figure 12:
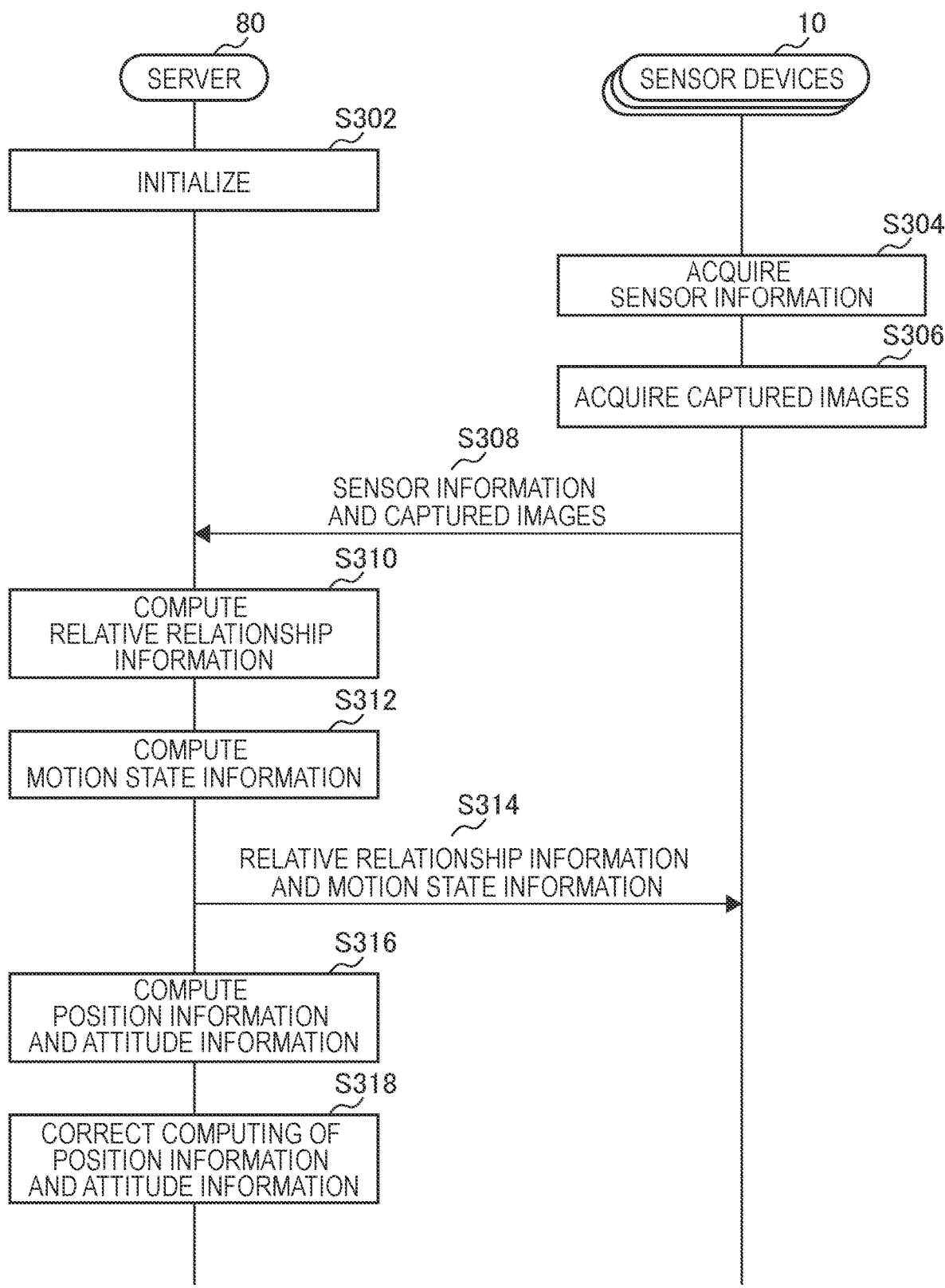
FIG. 12 is a sequence diagram illustrating an example of a flow of a process to be executed by a sensor system according to the embodiment.

FIG. 12 is a sequence diagram illustrating an example of a flow of a process to be executed in the sensor system 1 according to the present embodiment. The server 80 and the plurality of sensor devices 10 are involved in this sequence.

First, the server 80 initializes the position and the attitude of each of the sensor devices 10 in an inertial navigation system (step S302).

Next, the sensor devices 10 each acquire the sensor information (step S304), acquire the captured images (step S306), and notify the server 80 of the sensor information and the captured images (step S308).

Next, the server 80 computes the relative relationship information of each of the sensor devices 10 on the basis of the captured images of which each of the sensor devices 10 notifies the server 80 (step S310). Next, the server 80 computes the motion state information of each of the sensor devices 10 on the basis of the sensor information of which each of the sensor devices 10 notifies the server 80 (step S312). Next, the server 80 notifies each of the sensor devices 10 of the motion state information and the relative relationship information (step S314). Although not shown in the sequence, display control of the information codes and control of the imaging timing are performed in each of the sensor devices 10 on the basis of these kinds of information.

Next, the server 80 computes each of the position information and the attitude information by an inertial navigation system on the basis of the sensor information of which each of the sensor devices 10 notifies the server 80 (step S316). Then, the server 80 corrects the position information and the attitude information of each of the sensor devices 10 on the basis of the relationship information of each of the sensor devices 10 (step S318).

This is the end of the process. Note that the process according to steps S304 to S318 described above may be repeatedly performed or asynchronously performed.

4. Conclusion

In the above, an embodiment of the present disclosure has been described in detail with reference to FIG. 1 to FIG. 12. As described above, the sensor device 10 according to the present embodiment includes an inertial sensor, an information code formed so that the information code can be imaged from the outside, and an imaging unit that can capture the information code provided on the other sensor device 10. Each of the sensor devices 10 performs measurement with the inertial sensor and images the information code of each other. This enables correcting the attitude information and the position information to be computed by an inertial navigation system from the sensor information obtained from the inertial sensor on the basis of the relative relationship information to be obtained from the captured images. Thus, a mechanism that can easily reduce an accumulated error in a sensor is provided.

The present technology is applicable to various fields. For example, attaching the sensor devices 10 to an athlete can realize a camera that automatically performs imaging at the timing when the shake of the move of the imaging subject (the athlete with the sensor devices 10 attached or the opponent) is less. In addition, attaching the sensor devices 10 to each of a plurality of automatic driving bodies (drones or cars, for example) can realize a system that can keep a proper distance between the automatic driving bodies and avoid collision. In addition, attaching sensor devices 10 to an athlete and each of the drones with a camera mounted can realize drones with cameras mounted that automatically take pictures of the athlete. In addition, attaching the sensor device 10 to each movable part of a robot can realize a system that controls the attitude of the robot.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that the series of processes by each device described in this specification can be realized with any of software, hardware, and a combination of software and hardware. The programs included in the software are stored beforehand, for example, in the storage medium (non-transitory media) to be installed to the inside or the outside of each device. Then, each program is read into a RAM, for example, at the time of execution by the computer and executed by a processor such as a CPU.

In addition, the process described with a flowchart and a sequence diagram in this specification may not necessarily be executed in the order illustrated in the figures. Some process steps may be executed in parallel. In addition, an additional process step may be adopted or a part of the process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) A sensor device including:
a first inertial sensor;
a first information code formed to be capable of being imaged from an outside; and
a first imaging unit capable of imaging a second information code formed on another sensor device.

(2) The sensor device according to (1), further including:
an acquisition unit configured to acquire relative relationship information indicating at least one of a relative distance and attitude related to the sensor device and the other sensor device.

(3) The sensor device according to (2), further including:
a correction unit configured to correct, on a basis of the relative relationship information, an integral value calculated from sensor information measured by the first inertial sensor.

(4) The sensor device according to (3), in which the correction unit corrects an integral value calculated from sensor information measured by a second inertial sensor included in the other sensor device.

(5) The sensor device according to (3) or (4), in which the integral value is position information measured on a basis of angular velocity and acceleration.

(6) The sensor device according to any one of (3) to (5), in which the integral value is attitude information calculated on a basis of angular velocity.

(7) The sensor device according to any one of (2) to (6), in which the relative relationship information related to the sensor device and the other sensor device is recognized on a basis of a captured image of the second information code captured by the first imaging unit or a captured image of the first information code captured by a second imaging unit included in the other sensor device.

(8) The sensor device according to any one of (2) to (7), in which the acquisition unit acquires the relative relationship information between the other sensor devices.

(9) The sensor device according to any one of (1) to (8), in which the first imaging unit images the second information code in a case where magnitude of motion of the sensor device or the other sensor device or relative magnitude of motion of the sensor and the other sensor device falls below a threshold.

(10) The sensor device according to any one of (1) to (9), further including: a display unit configured to variably display the first information code.

(11) The sensor device according to (10), in which the display unit displays the first information code in which space frequency is small in a same direction as a direction in which the sensor device moves and space frequency is large in another direction.

(12) The sensor device according to (10), in which the display unit displays the first information code in which space frequency is small in a same direction as a direction in which the sensor device moves relatively with the other sensor device as a reference and space frequency is large in another direction.

(13) The sensor device according to any one of (1) to (12), further including:
a notification unit configured to notify another device of at least one of sensor information measured by the first inertial sensor, a captured image captured by the first imaging unit, and information indicating a computing result based thereon, in association with measurement time or imaging time.

(14) A sensor system including:
a plurality of sensor devices, in which
the sensor devices each include
an inertial sensor,
an information code formed to be capable of being imaged from an outside, and
an imaging unit capable of imaging the information code provided on the other sensor device.

(15) An information processing device including:
a processing unit configured to process sensor information and captured images acquired from a plurality of sensor devices each including an inertial sensor, an information code formed to be capable of being imaged from an outside, and an imaging unit capable of imaging the information code provided on another sensor device.

(16) A sensor device including:
a first inertial sensor; and
a first communication unit configured to transmit and receive a wireless signal to and from another sensor device.

(17) The sensor device according to (16), further including:
an acquisition unit configured to acquire relative relationship information indicating a relative distance related to the sensor device and the other sensor device, in which
the relative relationship information is recognized on a basis of a communication result of the first communication unit.

REFERENCE SIGNS LIST

1 sensor system
10 sensor device
20 attachment apparatus
21 sensor attachment tool
110 inertial sensor
120 imaging unit
130 communication unit
140 display unit
150 storage unit
160 processing unit
161 sensor information acquisition unit
162 motion state computing unit
163 outer information acquisition unit
164 captured image acquisition unit
165 recognition unit
166 display control unit
167 inertial navigation unit
168 notification unit 169 correction unit
80 server
810 communication unit
820 storage unit
830 processing unit

The invention claimed is:

1. A sensor device comprising:
    a first inertial sensor;
    a first information code formed to be capable of being imaged from an outside;
    a first imaging unit capable of imaging a second information code formed on another sensor device;
    an acquisition unit configured to acquire relative relationship information indicating at least one of a relative distance and attitude related between the sensor device and the another sensor device; and
    a correction unit configured to correct, on a basis of the relative relationship information, an integral value calculated from sensor information measured by the first inertial sensor,
    wherein the acquisition unit and the correction unit are each implemented via at least one processor.

2. The sensor device according to claim 1, wherein the correction unit corrects an integral value calculated from sensor information measured by a second inertial sensor included in the another sensor device.

3. The sensor device according to claim 1, wherein the integral value is position information measured on a basis of angular velocity and acceleration.

4. The sensor device according to claim 1, wherein the integral value is attitude information calculated on a basis of angular velocity.

5. The sensor device according to claim 1, wherein the relative relationship information related to the sensor device and the another sensor device is recognized on a basis of a captured image of the second information code captured by the first imaging unit or a captured image of the first information code captured by a second imaging unit included in the another sensor device.

6. The sensor device according to claim 1, wherein the acquisition unit acquires the relative relationship information between other sensor devices.

7. The sensor device according to claim 1, wherein the first imaging unit images the second information code in a case where magnitude of motion of the sensor device or the another sensor device or relative magnitude of motion of the sensor device and the another sensor device falls below a threshold.

8. The sensor device according to claim 1, further comprising:
    a display unit configured to variably display the first information code.

9. The sensor device according to claim 8, wherein the display unit displays the first information code in which space frequency is a first size in a same direction as a direction in which the sensor device moves and space frequency is a second size larger than the first size in another direction.

10. The sensor device according to claim 8, wherein the display unit displays the first information code in which space frequency is a first size in a same direction as a direction in which the sensor device moves relatively with the another sensor device as a reference and space frequency is a second size larger than the first size in another direction.

11. The sensor device according to claim 1, further comprising:
    a notification unit configured to notify another device of at least one of sensor information measured by the first inertial sensor, a captured image captured by the first imaging unit, and information indicating a computing result based thereon, in association with measurement time or imaging time,
    wherein the notification unit is implemented via at least one processor.

12. The sensor device according to claim 1, wherein the correction unit corrects the integral value using an arrangement in space formed by the sensor device and the another sensor device.

13. The sensor device according to claim 1, wherein the correction unit corrects the integral value using two arrangements in space formed by the sensor device and the another sensor device,
    wherein one of the two arrangements is formed continuously with the first inertial sensor, and
    wherein another of the two arrangement is formed intermittently with the first imaging unit.

14. A sensor system comprising:
    a plurality of sensor devices, wherein
    the sensor devices each include
        an inertial sensor,
        an information code formed to be capable of being imaged from an outside,
        an imaging unit capable of imaging the information code provided on another sensor device,
        an acquisition unit configured to acquire relative relationship information indicating at least one of a relative distance and attitude related between a respective sensor device and another of the sensor devices, and
        a correction unit configured to correct, on a basis of the relative relationship information, an integral value calculated from sensor information measured by the inertial sensor,
    wherein the acquisition unit and the correction unit are each implemented via at least one processor.

15. An information processing device comprising:
    a processing unit configured to process sensor information and captured images acquired from a plurality of sensor devices each including an inertial sensor, an information code formed to be capable of being imaged from an outside, and an imaging unit capable of imaging the information code provided on another sensor device;
    an acquisition unit configured to acquire relative relationship information indicating at least one of a relative distance and attitude related between one sensor device of the plurality of sensor devices and the another sensor device; and
    a correction unit configured to correct, on a basis of the relative relationship information, an integral value calculated from sensor information measured by the inertial sensor,
    wherein the processing unit, the acquisition unit, and the correction unit are each implemented via at least one processor.

* * * * *